US012806659B2

(12) United States Patent
Tost et al.

(10) Patent No.: US 12,806,659 B2
(45) Date of Patent: Nov. 24, 2026

(54) HIGH-PRESSURE CLEANING APPLIANCE

(71) Applicant: Andreas Stihl AG & Co. KG, Waiblingen (DE)

(72) Inventors: Christopher Tost, Auenwald (DE); Lukas Zuercher, Ludwigsburg (DE); Michael Renz, Stuttgart (DE); Simon Trinkle, Kaisersbach (DE); Richard Fresow, Remseck (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 887 days.

(21) Appl. No.: 17/856,607

(22) Filed: Jul. 1, 2022

(65) Prior Publication Data

US 2023/0001457 A1 Jan. 5, 2023

(30) Foreign Application Priority Data

Jul. 5, 2021 (EP) .................................... 21183718

(51) Int. Cl.
*B08B 3/02* (2006.01)
*B05B 9/04* (2006.01)
*B05B 12/08* (2006.01)

(52) U.S. Cl.
CPC ........... *B08B 3/026* (2013.01); *B05B 9/0403* (2013.01); *B05B 12/08* (2013.01); (Continued)

(58) Field of Classification Search
CPC . B08B 3/026; B08B 3/028; B08B 2203/0205; B08B 2203/0223; B08B 2203/027; B05B 9/0403; B05B 12/08
See application file for complete search history.

(56) References Cited

U.S. PATENT DOCUMENTS 8,444,068 B2 5/2013 Hahn et al.
9,051,927 B2 6/2015 Gilpatrick et al.
(Continued)

FOREIGN PATENT DOCUMENTS

CN 108816556 A 11/2018
DE 36 30 362 A1 3/1988
(Continued)

OTHER PUBLICATIONS

DE4411567—Machine Translation (Year: 1995).*
CN108816556—Machine Translation (Year: 2018).*

*Primary Examiner* — Joseph L. Perrin
(74) *Attorney, Agent, or Firm* — Walter Ottesen, P.A.

(57) ABSTRACT

A high-pressure cleaning appliance includes a connection for a liquid source, a delivery pump, a motor for driving the delivery pump, a delivery line through which liquid can be delivered from the connection to a spraying-out opening of the delivery line via the delivery pump, and a valve which is arranged in the delivery line. The motor has two operating states. The two operating states include an off state and an on state. The valve has two valve states, wherein the two valve states include a closed state and an open state. In the closed state, the valve prevents a flow of liquid through the delivery line. In the open state, the valve allows a flow of liquid through the delivery line. The high-pressure cleaning appliance is structurally configured in such a way that the adjustment of the operating state of the motor is possible only if the valve is in the open state.

15 Claims, 3 Drawing Sheets

(52) U.S. Cl.
CPC ................. *B08B 2203/0205* (2013.01); *B08B 2203/0223* (2013.01); *B08B 2203/027* (2013.01)

(56) References Cited

U.S. PATENT DOCUMENTS

| | | | | |
|---|---|---|---|---|
| 10,099,235 | B2 | 10/2018 | Reale | |
| 10,130,962 | B2 | 11/2018 | Dey et al. | |
| 10,960,440 | B2 | 3/2021 | Kloepfer et al. | |
| 2012/0216890 | A1 | 8/2012 | Nathan et al. | |
| 2014/0131475 | A1 | 5/2014 | Borinato | |
| 2015/0102121 | A1 | 4/2015 | Dey et al. | |
| 2015/0174598 | A1* | 6/2015 | Eschrich | B05B 9/01 239/526 |
| 2015/0251223 | A1* | 9/2015 | Horie | B08B 3/026 134/57 R |
| 2017/0225203 | A1 | 8/2017 | Kloepfer et al. | |
| 2017/0232482 | A1 | 8/2017 | Fischer et al. | |
| 2017/0282219 | A1 | 10/2017 | Kloepfer et al. | |
| 2018/0071792 | A1 | 3/2018 | Spengler et al. | |
| 2019/0030554 | A1* | 1/2019 | Mantes | B05B 9/0861 |
| 2019/0388916 | A1 | 12/2019 | Borinato | |
| 2019/0388923 | A1* | 12/2019 | Giacalone | B05B 12/00 |

FOREIGN PATENT DOCUMENTS

| | | | |
|---|---|---|---|
| DE | 44 11 567 | A1 | 10/1995 |
| DE | 20 2012 012 870 | U1 | 3/2014 |
| DE | 10 2014 115 789 | A1 | 5/2016 |
| EP | 1 357 289 | A2 | 10/2003 |
| EP | 1 526 049 | A1 | 4/2005 |
| EP | 2 483 561 | A1 | 8/2012 |
| EP | 2 747 908 | A1 | 7/2014 |
| EP | 2 879 780 | A2 | 6/2015 |
| EP | 3297764 | A1 | 3/2018 |
| WO | 2016/066209 | A1 | 5/2015 |
| WO | 2016/102074 | A1 | 6/2016 |
| WO | 2016/102075 | A1 | 6/2016 |
| WO | 2016097852 | A1 | 6/2016 |
| WO | 2019/023044 | A1 | 1/2019 |

* cited by examiner

HIGH-PRESSURE CLEANING APPLIANCE

CROSS REFERENCE TO RELATED APPLICATION

This application claims priority of European patent application no. 21183718.2, filed Jul. 5, 2021, the entire content of which is incorporated herein by reference.

TECHNICAL FIELD

The disclosure relates to a high-pressure cleaning appliance which has a connection for a liquid source, a delivery pump, a motor for driving the delivery pump, a delivery line through which liquid can be delivered from the connection to a spraying-out opening of the delivery line via the delivery pump, and a valve which is arranged in the delivery line.

BACKGROUND

EP 2 483 561 B1 has disclosed a high-pressure cleaning appliance which includes a bypass valve and a hydraulically controlled plunger for deactivating the pump of the high-pressure cleaning appliance. An increase in the pressure in the pressure line owing to a closure of the spraying-out opening results in the bypass line opening and, owing to a pressure difference brought about by the cleaning liquid, to the plunger being moved by way of the cleaning liquid so as to switch off the pump of the high-pressure cleaning appliance. Nevertheless, a high pressure remains in the pressure line, so that an operator, when actuating an actuating element, for opening the spraying-out opening, has to apply a large force in order to open, counter to the pressure, a corresponding valve in the pressure line. The processes for regulating the pressure and for opening and closing the valve in the pressure line via the actuating element are associated with high structural outlay and a high degree of wear of the components.

SUMMARY

The disclosure is based on an object of further developing a generic high-pressure cleaning appliance in such a way that it is convenient to use, can be used with a low degree of wear and can be produced with little structural outlay.

According to the disclosure, the high-pressure cleaning appliance is structurally configured in such a way that the adjustment of the operating state of the motor is possible only if the valve is in the open state. The two operating states of the motor include the off state and the on state. In the off state, the motor is off and is not supplied with electrical energy. In the on state, the motor is on and is supplied with electrical energy. The fact that the high-pressure cleaning appliance is structurally configured in such a way that the adjustment of the operating state of the motor is possible only if the valve is in the open state means that the motor can be switched from the off state into the on state only if the valve is in the open state. In this way, it is possible to avoid a situation in which a high pressure acts on the valve due to the motor and the delivery pump during the pumping of the liquid. The fact that the high-pressure cleaning appliance is structurally configured in such a way that the adjustment of the operating state of the motor is possible only if the valve is in the open state means that the motor can be switched from the on state into the off state only if the valve is in the open state. In this way, it is ensured that the pressure prevailing in the delivery line owing to the pumping of the liquid via the delivery pump can, at least in part, be reduced if the motor is transferred from the on state into the off state. In this way, a situation in which the valve is subjected to high pressure after being transferred into the closed state is avoided. The components involved in the switching-on and/or switching-off of the motor are not subjected to any pressure due to the liquid delivered by the delivery pump.

The fact that the high-pressure cleaning appliance is structurally configured in such a way that the adjustment of the operating state of the motor is possible only if the valve is in the open state means that build-up of a high pressure in the delivery line can be prevented. In this way, the valve may be configured for much lower pressures. Owing to the lower pressure in the delivery line, in particular if the valve is in the closed state and the motor is in the off state, a low force is required for setting the valve into the open state. In this case, the operator has to apply only a small force, since he or she does not have to work against a high pressure of the liquid in the delivery line. This makes possible a convenient use of the high-pressure cleaning appliance according to the disclosure.

In particular, the high-pressure cleaning appliance is structurally configured in such a way that the adjustment of the valve state is possible only if the motor is in the off state. In this way, the valve can be transferred from the closed state into the open state only if the motor is in the off state. Likewise, the valve can be transferred from the open state into the closed state only if the motor is in the off state. In this way, the valve may be configured for low pressures. The degree of wear of the valve is low.

Advantageously, the high-pressure cleaning appliance can be configured in such a way that the valve can be set into the closed state only after the motor has been set into the off state. In this way, it is ensured that, if the valve is closed, a high pressure cannot be formed in the delivery line of the high-pressure cleaning appliance. At the time of the closure of the valve, the motor of the delivery pump is already off. In this way, the delivery pump cannot increase the pressure of the liquid against the closed valve. The fact that the valve is closed only after the motor has been switched off means that pressure in the delivery line can already be reduced before the closure of the valve. In this way, easier and more convenient closure of the valve by the user is possible. This makes possible a convenient use of the high-pressure cleaning appliance according to the disclosure.

Advantageously, the motor can be set into the on state only after the valve has been set into the open state. In this way, an increase in the pressure on the closed valve due to the delivery pump is prevented. Therefore, in the closed state of the valve, a high pressure does not prevail at the valve. This makes possible simple and convenient opening of the valve. There is no need for the user to apply a large force for this purpose.

In an embodiment of the disclosure, the high-pressure cleaning appliance includes an actuating element. Expediently, the high-pressure cleaning appliance is configured in such a way that an electrical signal can be generated directly by the actuating element, and that the motor can be set into at least one of the two operating states as a consequence of the electrical signal generated directly by the actuating element.

In particular, the high-pressure cleaning appliance is configured in such a way that the electrical signal generated directly by the actuating element for setting the motor into at least one of the two operating states is forwarded, at least in part, wirelessly to the motor. Expediently, the electrical signal triggered by the actuating element can be communicated wirelessly to the motor. This makes possible particularly simple production of the high-pressure cleaning appliance. Moreover, a convenient use of the high-pressure cleaning appliance is possible. There is no need to take into account the routing of a cable. The actuating element can be positioned at any desired place along the delivery line of the high-pressure cleaning appliance.

Advantageously, the high-pressure cleaning appliance can be configured in such a way that the setting of the motor into at least one of the two operating states as a consequence of the electrical signal generated directly by the actuating element is realized independently of the pressure conditions in the delivery line. In particular, the adjustment of the motor from the on state into the off state is realized without an element that is adjusted in a manner dependent on the pressure in the delivery line. The fact that the motor can be set into the on position or the off position as a consequence of the electrical signal generated directly by the actuating element means that a high pressure in the delivery line can be avoided when the valve is in the closed state. Since the switching-off or switching-on of the motor does not need to be realized via a hydraulic mechanism, but rather is realized as a consequence of the electrical signal generated directly by the actuating element, the components involved are much less susceptible to wear.

The fact that the motor can be set into the off position or the on position as a consequence of the electrical signal generated directly by the actuating element means that quick switching-on of the motor and quick switching-off of the motor are possible. Such a configuration of the high-pressure cleaning appliance renders unnecessary hydraulic deactivation of the motor. Consequently, numerous components of the high-pressure cleaning appliance can be saved. These saved components are subjected to a high degree of wear in the prior art. This is not the case for the components required in the case of a configuration of the high-pressure cleaning appliance with the motor being switched on and switched off as a consequence of an electrical signal generated—without the effect of a hydraulic force—directly by the actuating element. In this way, operation with a low degree of wear is possible. Owing to the smaller number of components required to bring about the switching-on and switching-off of the motor, only a low structural outlay is required for producing the high-pressure cleaning appliance.

In an embodiment of the disclosure, the high-pressure cleaning appliance has a valve-actuating element which can be actuated separately from the actuating element. The valve can be set into one of the two valve states via the valve-actuating element. Expediently, the high-pressure cleaning appliance is configured in such a way that the actuating element, for setting the operating state of the motor, can be actuated only if the valve has been brought into the open state via the valve-actuating element. In particular, the valve-actuating element is configured in such a way that, when actuated, it releases the actuating element for actuation. In the case of actuation of the valve-actuating element, the valve is in the open state. In the case of non-actuation of the valve-actuating element, actuation of the actuating element is not possible. In the case of actuation of the actuating element, the motor is in the on state. It may be provided that the high-pressure cleaning appliance is configured in such a way that the valve-actuating element is in an arrested state when the actuating element is actuated. If the valve-actuating element is in an arrested state, it is held in a position in which the valve-actuating element otherwise is in the case of actuation by a user. Active actuation of the valve-actuating element by a user is not required in the case of the valve-actuating element being arrested.

In particular, the setting of the valve into one of the two valve states via the valve-actuating element is realized mechanically. In this case, the force applied by the operator is transmitted in particular directly to the valve.

Advantageously, the valve can be set into one of the two valve states via the actuating element. In this case, the actuating element serves both for setting the operating state of the motor and for setting the valve state of the valve. In this case, a valve-actuating element is not provided.

In particular, the setting of the valve into one of the two valve states via the actuating element is realized mechanically. In this case, the force applied by the operator is transmitted in particular directly to the valve.

In particular, the actuating element has a pivot lever with a first end position. Expediently, the valve is set in the closed state only in the first end position of the pivot lever. In particular, the high-pressure cleaning appliance is configured in such a way that the motor is set into the off state, as a consequence of the electrical signal generated directly by the pivot lever, prior to the first end position of the pivot lever being reached. It may however also be provided that the motor is set into the off state when the first end position of the pivot lever is reached. In this way, a temporal sequence for the switching-off of the motor and the transfer of the valve into the closed state is defined. The valve is closed after the motor has been switched off. It may also be provided that the valve closes when the motor is switched off.

In an embodiment of the disclosure, it is provided that, in the off state of the motor, a pressure which corresponds at most to 15 bar, in particular at most to 10 bar, preferably at most to the prevailing line pressure, acts on the valve in the closed state of the valve by way of the liquid in the delivery line. The prevailing line pressure is the pressure in the delivery line before the delivery pump, after connection of the liquid source, is put into operation for the first time. The prevailing line pressure is the pressure which prevails in the supply line of the liquid source. The fact that a pressure of at most 15 bar, in particular a pressure of at most 10 bar, preferably a pressure corresponding at most to the prevailing line pressure, acts on the valve means that the actuating element can be actuated with little force. The valve can be opened with little force.

Expediently, the valve is the only valve in the delivery line. This makes possible simple production of the high-pressure cleaning appliance. Only a small number of components are required.

In particular, the valve is arranged in the delivery line between the delivery pump and the spraying-out opening. It may however also be provided that the valve is arranged in the delivery line between the connection and the delivery pump.

Advantageously, the high-pressure cleaning appliance can be configured in such a way that the setting of the motor into at least one of the two operating states as a consequence of the electrical signal generated directly by the actuating element is realized independently of the pressure conditions in the delivery line. In particular, the setting of the motor into at least one of the two operating states is realized after generation of the electrical signal generated directly by the actuating element independently of the pressure conditions in the delivery line. In particular, the liquid in the delivery line is not involved in the forwarding of the electrical signal generated directly by the actuating element to the motor. Expediently, the communication of the electrical signal generated directly by the actuating element to the motor is realized exclusively electrically and/or electromagnetically.

In particular, the high-pressure cleaning appliance has a gun. Expediently, the actuating element is arranged on the gun. This allows intuitive use of the high-pressure cleaning appliance. The gun, in particular the spraying-out opening arranged in the gun, can be directed at a target, and at the same time the valve can be opened via the actuating element. Activation of the motor of the delivery pump is also possible via the actuating element. In this way, convenient operation of the high-pressure cleaning appliance is possible in a simple manner. Expediently, the delivery pump is formed separately from the gun.

In an embodiment of the disclosure, the high-pressure cleaning appliance is configured in such a way that the magnitude of the liquid volume flow delivered through the delivery line can be set by way of an electrical volume signal which can be selected via the actuating element. In particular, the electrical volume signal brings about a setting of the delivery power of the delivery pump. The larger the electrical volume signal, the higher the delivery power of the delivery pump.

It may also be provided that the high-pressure cleaning appliance has a regulation line which connects the part of the delivery line between the delivery pump and the spraying-out opening to the part of the delivery line between the connection and the delivery pump. In particular, a regulation valve is arranged in the regulation line. Expediently, the regulation valve can be set via the electrical volume signal generated directly by the actuating element. In this case, the regulation valve can be adjusted continuously in a stepped or stepless manner between a completely closed state and a completely open state. The regulation valve may have various degrees of closure between the completely closed state and the completely open state. It may be provided that the magnitude of the volume flow can be set by way of the degree of closure of the regulation valve.

It may be provided that the volume signal can be selected in multiple different steps. Expediently, the electrical volume signal can be selected steplessly via the actuating element. In particular, the electrical volume signal can be selected steplessly. In this way, the magnitude of the liquid volume flow delivered through the delivery line can be set steplessly.

In particular, the operator can freely select the pump power of the delivery pump via the actuating element, according to the required volume flow. It may also be provided that the operator can freely select the degree of closure of the regulation valve via the actuating element, according to the required volume flow.

In particular, the actuating element has a first end position, in which the valve is in the closed state. In particular, the actuating element has a second end position, in which the valve is in the open state. The actuating element covers a travel distance between the first end position and the second end position. Advantageously, the high-pressure cleaning appliance can be configured in such a way that the delivered volume flow is, at least sectionally, proportional to the travel distance covered by the actuating element. In other words, at least over a portion of the travel distance, it holds that: the greater the intensity of pressing of the actuating element, the greater the delivered volume flow. In particular, the strength of the electrical volume signal is, at least sectionally, proportional to the travel distance covered by the actuating element.

In an embodiment of the disclosure, it is provided that the high-pressure cleaning appliance has a bypass line which connects the delivery line between the delivery pump and the spraying-out opening to the delivery line between the connection and the delivery pump. In particular, an over-pressure valve is arranged in the bypass line.

In particular, the liquid source is an external liquid source. The high-pressure cleaning appliance is formed separately from the external liquid source.

BRIEF DESCRIPTION OF THE DRAWINGS

The invention will now be described with reference to the drawings wherein.

DESCRIPTION OF THE PREFERRED EMBODIMENTS

Figure 1:
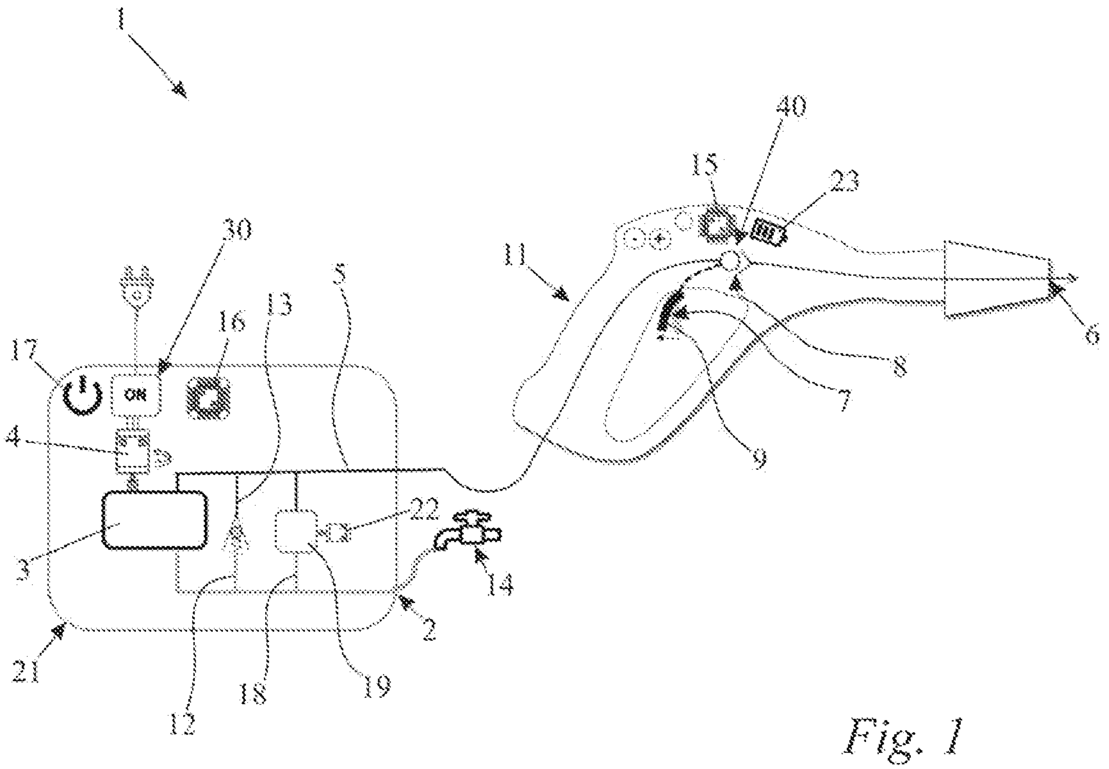
FIG. 1 shows a schematic illustration of a high-pressure cleaning appliance with an induction motor for the delivery pump, wherein the induction motor is in the on state and the valve in the delivery line is in the open state.

FIG. 1 shows a high-pressure cleaning appliance 1. The high-pressure cleaning appliance 1 includes a pump unit 21 and a gun 11. The pump unit 21 and the gun 11 are connected to one another via a delivery line 5. The pump unit 21 has a connection 2. A liquid source 14 is connected to the connection 2. In the embodiments, the liquid source 14 is an external liquid source. In the embodiments, the external liquid source is a tap of a domestic-water network. It may also be provided that the liquid source is an integral constituent part of the high-pressure cleaning appliance.

Figure 2:
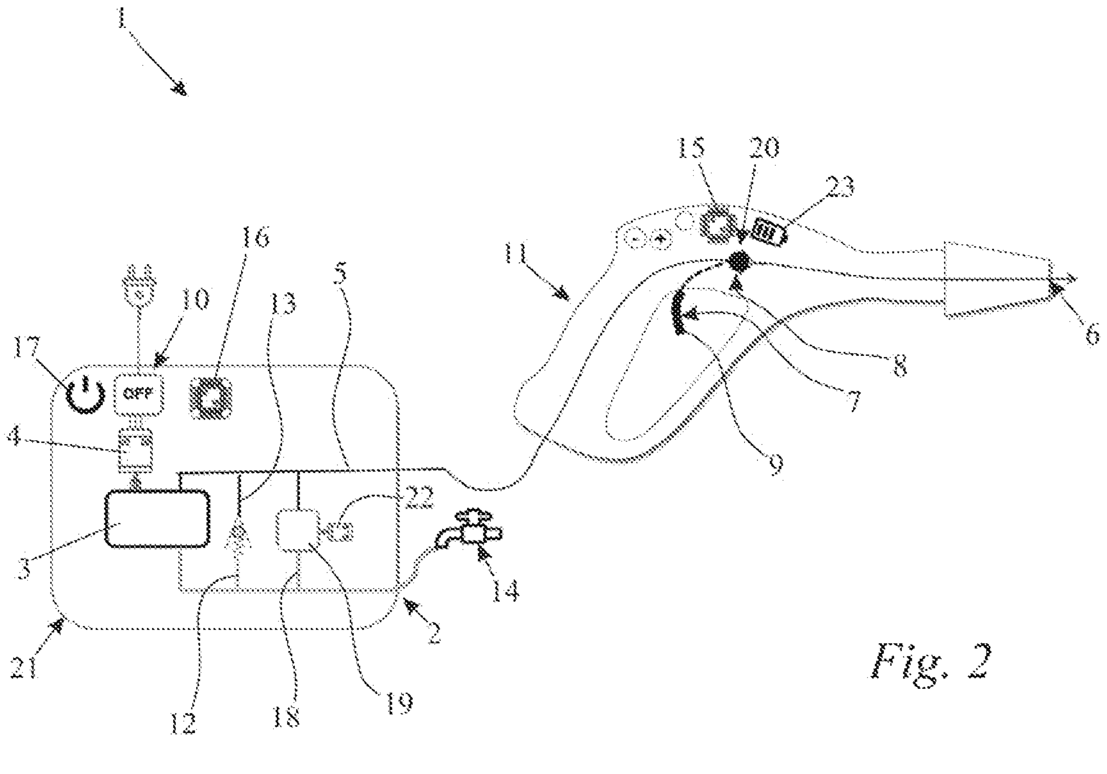
FIG. 2 shows a schematic illustration of the high-pressure cleaning appliance from FIG. 1, wherein the motor is in the off state and the valve is in the closed state.

The liquid source 14 supplies liquid to the delivery line 5. A delivery pump 3 is arranged in the delivery line. The delivery pump 3 pressurizes the liquid. A greater pressure prevails in the delivery line 5 downstream of the delivery pump 3 than upstream of the delivery pump 3. The delivery pump 3 is formed separately from the gun 11. Different guns can be connected to the delivery pump 3. For driving the delivery pump 3, the high-pressure cleaning appliance 1 has a motor 4. The motor 4 is arranged in the pump unit 21. The motor 4 may be in the form of a brushless direct-current motor. A brushless direct-current motor is also referred to as EC motor. The motor may however also be a universal motor. In the embodiment in FIG. 1, the motor 4 is an induction motor. In the case of an induction motor, a rotating magnetic field of the stator sets the rotor in motion. The induction motor in the embodiment in FIGS. 1 and 2 is operated with alternating-current voltage. The voltage source may be provided for example by the mains voltage. In the embodiment in FIG. 3, the motor 4 is a brushless direct-current motor. The brushless direct-current motor may also be operated with a battery or an accumulator. It may be provided that the accumulator is a constituent part of the high-pressure cleaning appliance 1.

Figure 3:
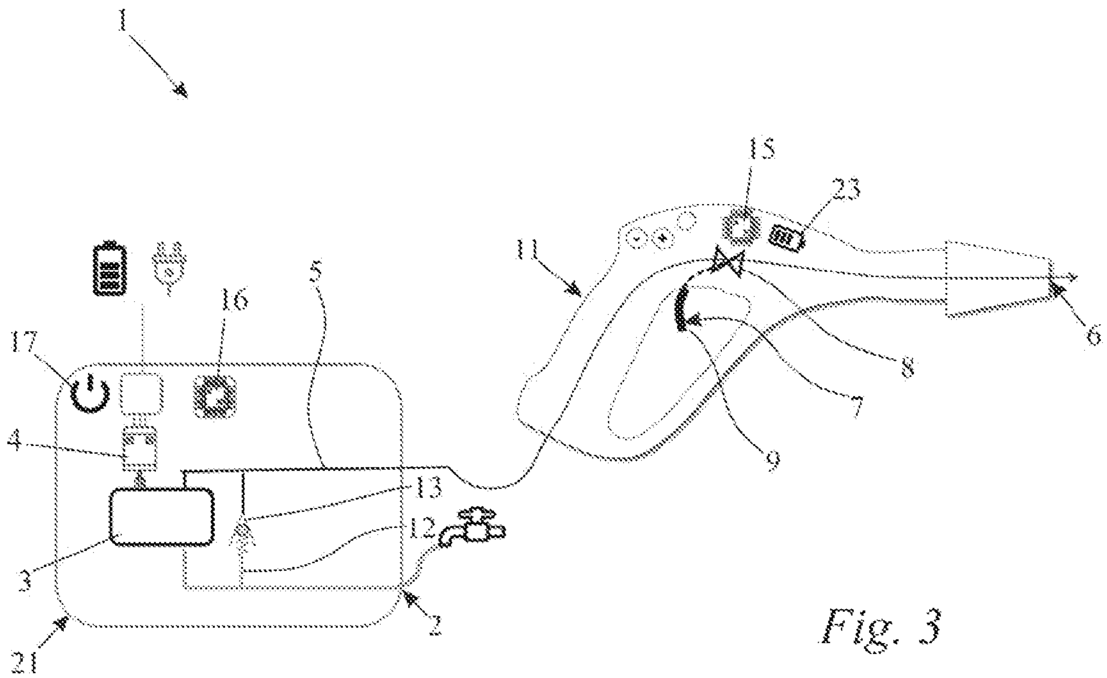
FIG. 3 shows a schematic illustration of a high-pressure cleaning appliance with a brushless direct-current motor for driving the delivery pump.

As illustrated in FIGS. 1 to 3, the high-pressure cleaning appliance 1 includes a main switch 17. The main switch 17 serves for interrupting the voltage supply of the entire high-pressure cleaning appliance 1. The main switch 17 is arranged on the pump unit 21.

Due to the motor 4 of the delivery pump 3, liquid is delivered from the connection 2 of the delivery line 5 to a spraying-out opening 6 of the delivery line 5. The spraying-out opening 6 is arranged in the gun 11.

The motor 4 of the high-pressure cleaning appliance 1 has two operating states. The two operating states include an on state 30 (FIG. 1) and an off state 10 (FIG. 2). In the off state 10, the motor 4 is off. No electrical power for operating the motor 4 is provided. In the on state 30 of the motor 4, the motor 4 is on. In the on state 30, the motor 4 is driven via electrical power.

The high-pressure cleaning appliance 1 has a valve 8. The valve 8 is arranged in the delivery line 5. The valve 8 has two valve states. The two valve states include a closed state 20 (FIG. 2) and an open state 40 (FIG. 1). In the open state 40, the valve allows a flow of liquid through the delivery line. In the closed state 20, the valve 8 prevents a flow of liquid through the delivery line 5. In the open state 40 of the valve 8, liquid is sprayed out from the spraying-out opening 6. In the closed state 20 of the valve 8, no liquid is sprayed out from the spraying-out opening 6.

The high-pressure cleaning appliance 1 has an actuating element 7. The actuating element 7 is formed separately from the main switch 17. In all the embodiments, the high-pressure cleaning appliance 1 is configured in such a way that, via the actuating element 7, the motor 4 can be set into one of the two operating states.

Via the actuating element 7, the motor 4 can be adjusted from the off state 10 into the on state 30. With the actuating element 7, the motor 4 can be adjusted from the on state 30 into the off state 10.

Figure 5:
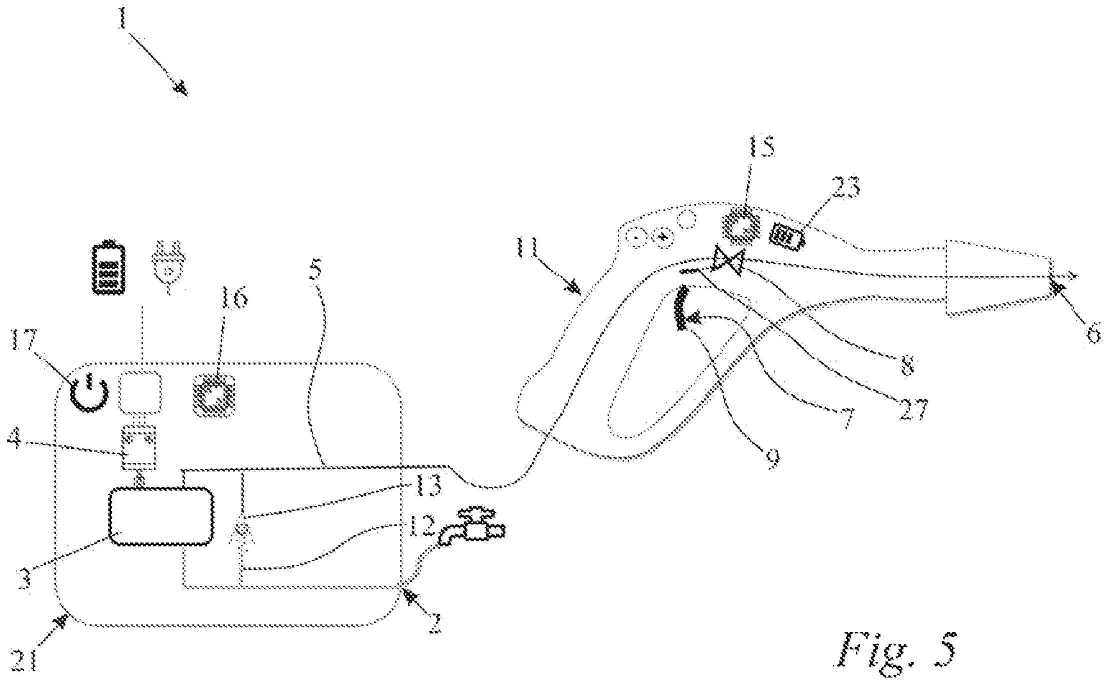
FIG. 5 shows a schematic illustration of a high-pressure cleaning appliance with an actuating element for setting the operating state of the motor of the delivery pump and with a valve-actuating element for setting the valve state of the valve.

In the embodiments in FIGS. 1 to 3, the high-pressure cleaning appliance 1 is configured in such a way that, with the actuating element 7, the valve 8 can be set into one of the two valve states. By way of the actuating element 7, the valve 8 can be transferred from the closed state 20 into the open state 40. By way of the actuating element 7, the valve 8 can be transferred from the open state 40 into the closed state 20. In the embodiment in FIG. 5, provision is made of a valve-actuating element 27 for setting the valve state of the valve 8. The valve-actuating element 27 is formed separately from the actuating element 7. In FIG. 5, the valve state of the valve 8 cannot be set by the actuating element 7.

In all the embodiments, the high-pressure cleaning appliance 1 is structurally configured in such a way that the adjustment of the operating state of the motor 4 is possible only if the valve 8 is in the open state 40. The motor 4 can be transferred from the off state 10 into the on state 30 only if the valve 8 is in the open state 40. The motor 4 can be transferred from the on state 30 into the off state 10 only if the valve 8 is in the open state 40.

In all the embodiments, the high-pressure cleaning appliance 1 is structurally configured in such a way that the adjustment of the valve state of the valve 8 is possibly only if the motor 4 is in the off state 10. The valve 8 can be transferred from the closed state 20 into the open state 40 only if the motor 4 is in the off state 10. The valve 8 can be transferred from the open state 40 into the closed state 20 only if the motor 4 is in the off state 10.

In all the embodiments, the high-pressure cleaning appliance 1 is configured in such a way that an electrical signal can be generated directly by the actuating element 7. In the embodiments, the generation of the electrical signal occurs by way of the allowance or prevention of a current flow. In this case, the resistance of a potentiometer is changed by the actuation of the actuating element 7 in such a way that current can flow or no current can flow through the electrical circuit in which the potentiometer is arranged. It may however also be provided that a switch is actuated by the actuating element, which switch closes or opens an electrical circuit and in this way allows or prevents a current flow. In the embodiments, the actuating element 7 acts mechanically on the potentiometer and in this way directly generates an electrical signal. Even the prevention of a current flow is referred to as generation of an electrical signal or as electrical signal.

As a consequence of the electrical signal generated directly by the actuating element 7, the motor 4 can, in all the embodiments, be set into at least one of the two operating states of the motor 4. The electrical signal may be an electrical on signal. The electrical signal may be an electrical off signal. If the actuating element 7 in the embodiments generates an electrical on signal, it allows a current flow in an electrical circuit. If the actuating element 7 in the embodiments generates an electrical off signal, it prevents a current flow in an electrical circuit.

As a consequence of the generation of the electrical on signal, the motor 4 is transferred from its off state 10 into its on state 30. As a consequence of the generation of the electrical off signal, the motor 4 is transferred from its on state 30 into its off state 10.

In all the embodiments, the high-pressure cleaning appliance 1 is configured in such a way that the setting of the motor 4 into one of the two operating states of the motor 4 as a consequence of the electrical signal generated directly by the actuating element 7 is realized independently of the pressure conditions in the delivery line 5.

If the motor 4 is in its on state and the valve 8 is in its open state 40, in all the embodiments, liquid is delivered from the connection 2 to the spraying-out opening 6 through the delivery line 5. This state is achieved by the actuating element 7. Prior to operation of the high-pressure cleaning appliance 1, the motor 4 is in the off state 10. The actuating element 7 is in the non-actuated state. The valve 8 is in the closed state 20. This state of the high-pressure cleaning appliance 1 is illustrated in FIG. 2. With the valve 8 closed and the motor 4 of the delivery pump 3 in a switched-off state, no liquid is delivered through the delivery line 5.

In the embodiments in FIGS. 1 to 3, the valve 8 is transferred from its closed state 20 (illustrated in FIG. 2) into its open state 40 (illustrated in FIG. 1) by the actuating element 7. Only afterwards is the electrical signal for transferring the motor 4 from its off state 10 (illustrated in FIG. 2) into its on state 30 (illustrated in FIG. 1) triggered by the actuating element 7. The high-pressure cleaning appliance 1 is configured in such a way that the motor 4 can be set into the on state 30 only after the setting of the valve 8 into the open state 40. In the embodiment in FIG. 5, the setting of the valve state of the valve 8 is realized by the valve-actuating element 27.

In the embodiment in FIGS. 1 and 2, it is provided that the valve 8 can be switched mechanically between the closed state 20 and the open state 40 by the actuating element 7. It may also be provided that the valve 8 can be switched electrically between the closed state 20 and the open state 40 as a consequence of an electrical valve signal generated directly by the actuating element 7. In this way, the actuating element 7 can be arranged at a distance from the valve 8. It may also be provided that the valve signal generated directly by the actuating element is forwarded, at least in part, wirelessly to the valve 8.

The generation of the electrical valve signal can occur by way of the allowance or prevention of a current flow. In this case, the resistance in an electrical circuit is changed by the actuation of the actuating element in such a way that current can flow or no current can flow through the electrical circuit. It may for example also be provided that a switch is actuated by the actuating element, which switch closes or opens an electrical circuit and in this way allows or prevents a current flow. Even the prevention of a current flow is referred to as generation of an electrical signal or as electrical signal.

In the closed state 20 of the valve 8, the valve 8 is completely closed in all the embodiments. In the open state 40 of the valve 8, the valve 8 is at least partially open. In the open state 40 of the valve 8, a flow of liquid through the valve 8 is possible. It may be provided that the open state 40 of the valve 8 includes multiple different degrees of opening. In the embodiments, the valve 8 is completely open in the open state 40. In the embodiments, the valve 8 is arranged in the delivery line 5 between the delivery pump 3 and the spraying-out opening 6. The valve 8 is arranged in the gun 11. It may however also be provided that the valve 8 is arranged in the delivery line between the connection 2 and the delivery pump 3.

In all the embodiments, the high-pressure cleaning appliance 1 is configured in such a way that the electrical signal generated directly by the actuating element 7 is forwarded wirelessly to the motor 4. In this case, the electrical signal generated directly by the actuating element 7 is converted into an electromagnetic signal and is forwarded in this way. It may however also be provided that the electrical signal is transmitted to the motor via a cable. In the embodiments, the actuating element 7 is connected electrically to a transmission apparatus 15. Upon actuation of the actuating element 7, an electrical signal is generated directly by the actuating element 7, communicated electrically to the transmission apparatus 15, and sent by the transmission apparatus 15 as a wireless signal. The transmission apparatus 15 is arranged on the gun 11. In the embodiments, the transmission apparatus 15 is supplied with energy via a battery 23.

For receiving the wireless signal, the high-pressure cleaning appliance 1 includes a receiving apparatus 16. The receiving apparatus 16 receives the wireless signal sent by the transmission apparatus 15 and communicates it to the motor 4. For this purpose, the receiving apparatus 16 is connected electrically to the motor 4. The forwarding of the received wireless signal by the receiving apparatus 16 to the motor 4 is realized electrically. The on signal can be communicated from the actuating element 7 to the motor 4 via the transmission apparatus 15 and the receiving apparatus 16. The off signal can be communicated from the actuating element 7 to the motor 4 via the transmission apparatus 15 and the receiving apparatus 16. The signal sent by the transmission apparatus 15 to the receiving apparatus 16 may be a radio signal. In the embodiments, the signal sent by the transmission apparatus 15 to the receiving apparatus 16 is a Bluetooth signal.

In all the embodiments, the high-pressure cleaning appliance 1 is configured in such a way that the setting of the motor 4 into at least one of the two operating states as a consequence of the electrical signal generated directly by the actuating element 7 is realized independently of the pressure conditions in the delivery line 5. The forwarding of the electrical signal generated directly by the actuating element 7 to the motor 4 does not involve the liquid in the delivery line 5. The communication of the electrical signal generated directly by the actuating element 7 to the motor 4 is realized exclusively electrically and/or electromagnetically. In the embodiments, the communication of the electrical signal generated directly by the actuating element 7 to the motor 4 involves a conversion of the electrical signal into an electromagnetic signal. After being received by the receiving apparatus 16, the electromagnetic signal is reconverted back into an electrical signal.

In the embodiments, the actuating element 7 is arranged on the gun 11. In the embodiments, the transmission apparatus is arranged on the gun 11. The receiving apparatus 16 is arranged on the pump unit 21.

Upon actuation of the actuating element 7 in that state of the high-pressure cleaning appliance 1 which is illustrated in FIG. 2, firstly the valve 8 is opened and subsequently—upon further actuation of the actuating element 7—the motor 4 is switched on. The high-pressure cleaning appliance 1 is then in the state illustrated in FIG. 1. Liquid is delivered from the connection 2 to the spraying-out opening 6 through the delivery line 5. Liquid sprays at high pressure out of the spraying-out opening 6. The actuation of the actuating element 7 in the embodiment in FIG. 3 is realized in the same manner.

If the operator wishes to end the spraying operation, he or she releases the actuation of the actuating element 7. The high-pressure cleaning appliance 1 is configured in such a way that the valve 8 can be transferred into the closed state 20 only after the motor 4 has been set into the off state 10. Upon release of the actuation of the actuating element 7, firstly the motor 4 is transferred from the on state 30 into the off state 10. Only afterwards—upon further release of the actuation of the actuating element 7—is the valve 8 transferred from the open state 40 into the closed state 20. In the embodiments in FIGS. 1 to 3, the valve state of the valve 8 is set by the actuating element 7. In the embodiments in FIGS. 1 to 3, a single component, specifically the actuating element 7, is provided for the setting of the operating state of the motor 4 and for the setting of the valve state of the valve 8. In the embodiment in FIG. 5, the valve state of the valve 8 is determined by the position of the valve-actuating lever 27. Here, two components are provided for the setting of the operating state of the motor 4 and for the setting of the valve state of the valve 8.

After the transfer of the valve 8 from the open state 40 into the closed state 20, the high-pressure cleaning appliance 1 is again in the state illustrated in FIG. 2: the motor 4 is off, the valve 8 is closed. This applies analogously in the other embodiments. No liquid is delivered in the delivery line 5. Only the pressure generated by the liquid source 14 prevails at the valve 8. The pressure generated by the liquid source 14 is referred to as line pressure. In the off state 10 of the motor 4, a pressure which corresponds at most to the prevailing line pressure acts on the valve 8 in the closed state 20 by way of the liquid in the delivery line 5. In particular, in the off state 10 of the motor 4, a pressure which corresponds at most to 15 bar, in the embodiments at most to 10 bar, acts on the valve 8 in the closed state 20 by way of the liquid in the delivery line 5.

In the embodiments, the actuating element 7 is a pivot lever 9. The pivot lever 9 has a first end position. The high-pressure cleaning appliance 1 in FIGS. 1 to 3 is configured in such a way that the valve 8 is set in the closed state 20 only in the first end position of the pivot lever 9. The motor 4 is transferred into the off state 10 prior to the first end position of the pivot lever 9 being reached. It may also be provided that the motor 4 is transferred into the off state 10 when the first end position of the pivot lever 9 is reached. An actuating element configured in a form differing from a pivot lever also has a corresponding first end position.

In all the embodiments, the high-pressure cleaning appliance 1 is configured in such a way that the magnitude of the liquid volume flow delivered through the delivery line 5 can be set by way of an electrical volume signal which can be selected via the actuating element 7. The greater the intensity of actuation of the actuating element 7, the stronger the volume signal. For setting the magnitude of the volume signal, in the embodiments, the actuating element 7 is connected mechanically to the potentiometer. The output voltage of the potentiometer is evaluated. The output voltage can be set via the actuating element 7. In the embodiments, the magnitude of the volume signal is dependent on the magnitude of the output voltage.

It may also be provided that the electrical signal generated directly by the actuating element 7 as a consequence of which the motor 4 can be set into at least one of the two operating states is the volume signal. If the volume signal falls below a specific value or is zero, it is the off signal which sets the motor 4 into the off state 10. If the volume signal exceeds a specific value or is non-zero, it is the on signal which sets the motor 4 into the on state 30. It may however also be provided that the electrical signal generated directly by the actuating element 7 as a consequence of which the motor 4 can be set into at least one of the two operating states and the volume signal are signals which are completely different from one another.

In the embodiment in FIG. 3 and in the embodiment in FIG. 5, the electrical volume signal brings about a setting of the delivery power of the delivery pump 3. The larger the electrical volume signal, the higher the delivery power of the delivery pump 3. The larger the electrical volume signal, the higher the rotational speed of the motor 4.

In the embodiment in FIGS. 1 and 2, the rotational speed of the motor 4 is approximately constant. The magnitude of the volume flow of the liquid in the delivery line 5 is set here in a different manner. The high-pressure cleaning appliance 1 has a regulation line 18. The regulation line 18 connects the part of the delivery line 5 between the delivery pump 3 and the spraying-out opening 6 to the part of the delivery line 5 between the connection 2 and the delivery pump 3. When the delivery pump 3 is in operation, a greater pressure prevails in the part of the delivery line 5 between the delivery pump 3 and the spraying-out opening 6 than in the part of the delivery line 5 between the connection 2 and the delivery pump 3. Owing to the pressure gradient in this case, liquid can flow from the part of the delivery line 5 between the delivery pump 3 and the spraying-out opening 6 into the part of the delivery line 5 between the connection 2 and the delivery pump 3 through the regulation line 18. A regulation valve 19 is arranged in the regulation line 18. The regulation valve 19 can be set via the electrical positive-pressure signal generated directly by the actuating element 7. In this case, the regulation valve 19 can be adjusted continuously in a stepped or stepless manner between a completely closed state and a completely open state. The regulation valve 19 may have various degrees of closure between the completely closed state and the completely open state. In the embodiment in FIGS. 1 and 2, the regulation valve 19 is continuously adjustable. The magnitude of the volume flow of the liquid in the delivery line 5 can be set in a manner dependent on the degree of closure of the regulation valve 19. The higher the degree of closure of the regulation valve 19, the greater the volume flow of the liquid in the delivery line 5. The higher the degree of closure of the regulation valve 19, the greater that volume flow of the liquid in the delivery line 5 which is present at the spraying-out opening 6.

For setting the degree of closure of the regulation valve 19, the high-pressure cleaning appliance 1 in FIGS. 1 and 2 has a servomotor 22.

In the embodiments, the high-pressure cleaning appliance 1 is configured in such a way that the electrical volume signal generated directly by the actuating element 7 is forwarded wirelessly to the pump unit 21. In this case, the electrical volume signal generated directly by the actuating element 7 is converted into an electromagnetic signal and is forwarded in this way. It may however also be provided that the electrical volume signal is transmitted to the pump unit 21 via a cable. In the embodiments, the actuating element 7 is connected electrically to the transmission apparatus 15. Upon actuation of the actuating element 7, if the motor 4 is in the on state 30, an electrical volume signal is generated directly by the actuating element 7, communicated electrically to the transmission apparatus 15, and sent by the transmission apparatus 15 as a wireless signal.

The wireless signal sent by the transmission apparatus 15 that was generated via the volume signal is received by the receiving apparatus 16.

In the embodiment in FIGS. 1 and 2, the signal is then forwarded to the servomotor 22, which sets the degree of closure of the regulation valve 19 according to the original volume signal.

In the embodiment in FIG. 3, the signal is then forwarded to the motor 4, which then sets the rotational speed according to the original volume signal.

For communicating the signal of the receiving apparatus 16 that was triggered by the volume signal, the receiving apparatus 16 is connected electrically to the motor 4. The forwarding of the received wireless signal triggered by the volume signal by the receiving apparatus 16 to the motor 4 is realized electrically. The volume signal can be communicated from the actuating element 7 to the pump unit 21 via the transmission apparatus 15 and the receiving apparatus 16. The signal sent by the transmission apparatus 15 to the receiving apparatus 16 and triggered by the volume signal may be a radio signal. In the embodiments, the signal sent by the transmission apparatus 15 to the receiving apparatus 16 is a Bluetooth signal.

It may be provided that the volume signal can be selected in multiple different steps. In the embodiments, the electrical volume signal can be selected steplessly via the actuating element 7. The electrical volume signal can be set steplessly.

In the embodiment in FIGS. 1 and 2, the operator can freely select the degree of closure of the regulation valve 19 via the actuating element 7, according to the required volume flow.

In the embodiment in FIG. 3, the operator can freely select the pump power of the delivery pump 3 via the actuating element 7, according to the required volume flow.

In all the embodiments, the high-pressure cleaning appliance 1 has a bypass line 12. The bypass line 12 connects the part of the delivery line between the delivery pump 3 and the spraying-out opening 6 to the part of the delivery line between the connection 2 and the delivery pump 3. An overpressure valve 13 is arranged in the bypass line 12. The overpressure line 13 opens in the event of an overpressure in the part of the delivery line between the delivery pump 3 and the spraying-out opening 6. An overpressure can occur for example if, owing to a defect, the motor 4 is not in the off state 30 and the valve 8 is nevertheless in the closed state 20. The overpressure valve 13 provides for safe operation of the high-pressure cleaning appliance 1.

As illustrated in FIG. 2, the actuating element 7 has the first end position, in which the valve 8 is in the closed state. The actuating element 7 has a second end position (illustrated in FIG. 1), in which the valve 8 is in the open state. The actuating element 7 covers a travel distance between the first end position and the second end position.

In the embodiments, the high-pressure cleaning appliance 1 is configured in such a way that the delivered volume flow is, at least sectionally, proportional to the travel distance covered by the actuating element 7. In other words, at least over a portion of the travel distance, it holds that: the greater the intensity of pressing of the actuating element 7, the greater the delivered volume flow. The strength of the electrical volume signal is, at least sectionally, proportional to the travel distance covered by the actuating element 7.

Figure 4:
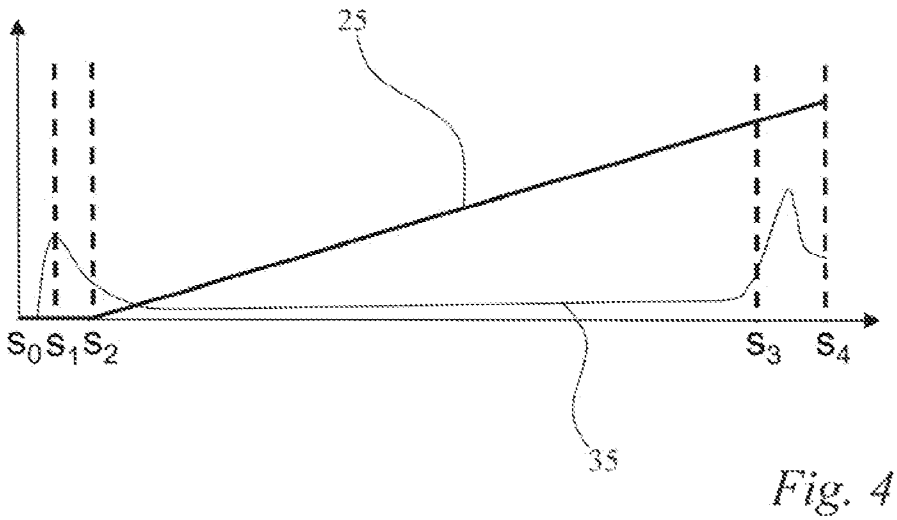
FIG. 4 shows a schematic diagram in which the dependencies of the volume flow in the delivery line, of the voltage signal of a potentiometer, and of the counter-pressure applied against the operator by the actuating element during operation of the actuating element on the travel distance covered by the actuating element between a first end position and a second end position are illustrated.

This is illustrated in the diagram in FIG. 4. The diagram applies to the embodiments in FIGS. 1 to 3. The abscissa axis (x-axis) shows the travel distance of the actuating element. The actuating element 7 assumes the first end position between those positions of the travel distance indicated by $s_0$ and $s_1$. The actuating element 7 assumes the second end position between those positions of the travel distance indicated by $s_3$ and $s_4$. It holds that: $s_0<s_1<s_2<s_3<s_4$. Moreover, $s_1$ is not equal to $s_2$. Furthermore, $s_1$ is not equal to $s_3$.

Two different variables are plotted on the ordinate axis (y-axis). The curve 25 shows the magnitude of the volume flow of the liquid in the delivery line 5 in the region before the spraying-out opening 6. The curve 35 shows the counter-pressure applied against an operator by the actuating element 7.

The position $s_0$ corresponds to the position illustrated in FIG. 2 of the actuating element 7. The actuating element 7 is in the non-actuated state. The valve 8 is in the closed state. The motor 4 is off. The volume flow 25 is zero. The regulation valve 19 is completely open. In the embodiment in FIG. 3, analogously to this, the rotational speed of the motor 4 is zero.

If the operator actuates the actuating element 7 in this situation, the latter firstly covers the travel distance from the position $s_0$ to the position $s_1$. In this case, the valve 8 is mechanically opened. To open the valve 8, the operator must apply a force. The counter-pressure 35 of the actuating element 7 increases over the travel distance of the actuating element 7 from the position $s_0$ to the position $s_1$. At the position $s_1$ of the actuating element 7, the motor 4 is, in all the embodiments, in its off state. The volume flow 25 is zero.

If the actuating element 7 is further actuated, the actuating element 7 covers the travel distance from the position $s_1$ to the position $s_2$. Only at the position $s_2$ does the actuating element 7 directly generate the electrical signal which triggers the setting of the motor 4 into the on state 30. The motor 4 is in the on state 30 between the positions $s_2$ and $s_4$. The on state 30 is illustrated by way of example in FIG. 1. The delivery pump 3 then delivers liquid through the delivery line 5. The volume flow 25 is then no longer zero. The rotational speed of the motor 4 in FIG. 3 is not equal to zero. The regulation valve 19 in FIGS. 1 and 2 is completely open.

In the range between the positions $s_2$ and $s_3$ of the travel distance of the actuating element 7, the motor 4 is in the on state 30. The valve 8 is open. In the range between the positions $s_2$ and $s_3$ of the travel distance of the actuating element 7, the actuating element 7 directly generates an electrical volume signal. The volume signal becomes stronger with larger travel distance of the actuating element 7. Accordingly, it is also the case that the volume flow 25 increases. In the range between the positions $s_2$ and $s_3$ of the travel distance of the actuating element 7, the strength of the electrical volume signal 25 is proportional to the travel distance covered by the actuating element 7. The rotational speed of the motor 4 in FIG. 3 increases as the travel distance covered by the actuating element 7 increases. The regulation valve 19 in FIGS. 1 and 2 is closed further continuously as the travel distance covered by the actuating element 7 increases. As the volume flow 25 increases, the pressure in the delivery line 5 also increases. The actuating element 7 is in a state preloaded into the position $s_0$. In the embodiments, a spring pushes the actuating element 7 into the position $s_0$. The counter-pressure 35 on the actuating element 7 slightly increases as the travel distance covered by the actuating element 7 increases, owing to the larger spring force.

The range of the travel distance of the actuating element 7 between the positions $s_3$ and $s_4$ is associated with a boost function. The boost function again provides a larger volume flow and thus a higher pressure for the liquid in the delivery line 5 in the region of the exit opening 6. In order to pass into this range, the operator must firstly exert a larger force on the actuating element 7. If, proceeding from position $s_3$, the operator actuates the actuating element 7 further, the counter-pressure on the actuating element 7 firstly increases sharply. This increase in the counter-pressure is for structural reasons. In the embodiments, the actuating element 7 has to overcome a latching protuberance which presents a resistance for the actuating element 7. Owing to the larger force required for this purpose that is to be applied by the operator, the actuating element 7, after overcoming the highest counter-pressure, covers the remaining travel distance up to the position $s_4$ very quickly and jerkily. Therefore, in terms of time, the volume flow 25 increases very quickly in this range. This is perceived as a jump in the volume flow 25 by the operator. A larger volume flow 25, and thus also a larger pressure, is available in an abrupt manner. The boost function has been activated. After the highest counter-pressure between the positions $s_3$ and $s_4$ has been overcome, the counter-pressure decreases again over the travel of the actuating element 7 to the position $s_4$.

If the operator ends the actuation of the actuating element 7 in the position $s_4$, the actuating element 7 is pushed back into the position $s_0$ owing to the spring. Over the travel of the actuating element 7 from the position $s_4$ to the position $s_0$, firstly, at the position $s_2$, the actuating element 7 directly generates the electrical signal that brings about a setting of the motor 4 into the off state 10 and subsequently, at the position $s_1$, the valve 8 is set mechanically into the closed position 20.

FIG. 5 shows an alternative embodiment for a high-pressure cleaning appliance 1. Apart from the configuration of the actuating element 7, the high-pressure cleaning appliance 1 in FIG. 5 corresponds to the high-pressure cleaning appliance in FIG. 3.

The following text exclusively describes the embodiment in FIG. 5. The high-pressure cleaning appliance in FIG. 5 has the valve-actuating element 27. The valve-actuating element 27 can be actuated separately from the actuating element 7. The valve 8 can be set into one of the two valve states via the valve-actuating element 27. The high-pressure cleaning appliance 1 is configured in such a way that the actuating element 7, for setting the operating state of the motor 4, can be actuated only if the valve 8 has been brought into the open state 40 via the valve-actuating element 27.

In the embodiment in FIG. 5, the valve-actuating element 27 is in a state preloaded into a home position, in which home position the valve 8 is in the closed state 20 owing to the position of the valve-actuating element 27. The valve-actuating element 27 is in a state preloaded into the home position via a spring. Upon actuation of the valve-actuating element 27, the latter is pressed out of the home position counter to the force of the spring. In this case, the valve 8 is set into the open state 40. After the valve-actuating element 27 has been moved out of the home position, the valve-actuating element 27 is in an open position. The setting of the valve 8 into one of the two valve states via the valve-actuating element 27 is realized mechanically. In this case, the force applied by the operator is transmitted directly to the valve 8.

In the embodiment in FIG. 5, the actuating element 7 is not provided for setting the valve state of the valve 8. The valve state of the valve 8 can be set exclusively via the valve-actuating element 27.

The high-pressure cleaning appliance 1 is structurally configured in such a way that an actuation of the actuating element 7 is possible only if the valve-actuating element 27 has been moved out of the home position. The high-pressure cleaning appliance 1 is structurally configured in such a way that an actuation of the actuating element 7 is possible only if the valve-actuating element 27 is in the open position. The high-pressure cleaning appliance 1 is structurally configured in such a way that an actuation of the actuating element 7 is possible only if the valve 8 is in the open state 40. In the embodiment in FIG. 5, the actuation of the actuating element 7 brings about a setting of the motor 4 into the on state 30. In the case of non-actuation of the actuating element 7, the actuating element 7 is in a position in which the motor 4 is in the off state 10 owing to the position of the actuating element 7.

The high-pressure cleaning appliance 1 is configured in such a way that the rotational speed of the motor 4 is dependent on the position of the actuating element 7. In the embodiment, the travel distance covered by the actuating element 7 is, at least sectionally, proportional to the rotational speed of the motor 4.

The high-pressure cleaning appliance 1 is structurally configured in such a way that, with the actuating element 7 in the actuated state, the valve-actuating element 27 is in a state arrested in the open position. If the valve-actuating element 27 is in an arrested state, it is held in the open position without actuation of the valve-actuating element 27 by a user. An active actuation of the valve-actuating element 27 by a user is not necessary if the valve-actuating element 27 is arrested. In the case of non-actuation of the actuating element 7, the arresting of the valve-actuating element 27 is in a released state. In this way, it is ensured that the valve 8 is at all times in the open state 40 when the motor 4 is in the on state 30.

In the embodiment in FIG. 5, the valve-actuating element 27 and the actuating element 7 are arranged on the gun 11 of the high-pressure cleaning appliance 1. The valve-actuating element 27 and the actuating element 7 are oriented in relation to one another in such a way that they can be operated using a single hand. The valve-actuating element 27 can be operated by the thumb, and at the same time the actuating element 7 can be operated by one of the other fingers of the same hand.

In all the embodiments, the actuating element 7 is preloaded into a position in which the motor 4 is in the off state 10 owing to the position of the actuating element 7. In the embodiments, the actuating element 7 is preloaded into this position via a spring.

It is understood that the foregoing description is that of the preferred embodiments of the invention and that various changes and modifications may be made thereto without departing from the spirit and scope of the invention as defined in the appended claims.

What is claimed is:

1. A high-pressure cleaning appliance connectable to a liquid source, the high-pressure cleaning appliance comprising:

a connection for connecting to the liquid source;

a delivery pump;

a motor for driving said delivery pump;

a delivery line having a spraying-out opening;

said delivery line being configured to deliver the liquid of said liquid source from said connection to said spraying-out opening via said delivery pump;

a valve arranged in said delivery line;

said motor having two operating states defined by an off-state and an on-state;

said valve having a closed state wherein said valve prevents a flow of liquid through said delivery line and an open state wherein said valve allows a flow of liquid through said delivery line; and said high-pressure cleaning appliance being structurally configured such that the motor can be switched from the off-state into the on-state only if the valve is in the open state and that the motor can be switched from the on-state into the off-state only if the valve is in the open state, wherein said high-pressure cleaning appliance is configured so as to permit said valve to be set into said closed state only after said motor has been set into said off-state.

2. The high-pressure cleaning appliance of claim 1, wherein said motor can be set into said on-state only after said valve has been set into said open state.

3. The high-pressure cleaning appliance of claim 1, further comprising:

an actuating element; and said high-pressure cleaning appliance being configured such that:

an electrical signal can be generated by said actuating element; and said motor can be set into at least one of said two operating states in response to said electrical signal generated by said actuating element.

4. The high-pressure cleaning appliance of claim 3, wherein said electrical signal generated directly by said actuating element for setting said motor into at least one of said two operating states is forwarded, at least in part, wirelessly to said motor.

5. The high-pressure cleaning appliance of claim 3, wherein said high-pressure cleaning appliance is configured in such a way that the setting of said motor into at least one of said two operating states in response to said electrical signal generated by said actuating element is realized independently of the pressure conditions in said delivery line.

6. The high-pressure cleaning appliance of claim 3, further comprising a valve-actuating element actuable separately from said actuating element in that said valve can be set into one of said two valve states via said valve-actuating element; and, in that said high-pressure cleaning appliance is configured in such a way that said actuating element for setting the operating state of said motor can be actuated only when the valve has been brought into said open state via said valve-actuating element.

7. The high-pressure cleaning appliance of claim 3, wherein said valve can be set into one of said two valve states via said actuating element.

8. The high-pressure cleaning appliance of claim 6, wherein said actuating element has a pivot lever with a first end position, in that the valve is set in the closed state only in the first end position of said pivot lever and in that said motor is set into said off state in advance of said first end position being reached.

9. The high-pressure cleaning appliance of claim 1, wherein, in said off-state of said motor, a pressure of at most 15 bar acts on said valve in said closed state by way of the liquid in said delivery line.

10. The high-pressure cleaning appliance of claim 1, wherein said valve is arranged in said delivery line between said delivery pump and said spraying-out opening.

11. The high-pressure cleaning appliance of claim 1, further comprising:

a gun; and an actuating element;

said actuating element being arranged on said gun; and said delivery pump being configured separately from said gun.

12. The high-pressure cleaning appliance of claim 1, further comprising an actuating element, wherein said high-pressure cleaning appliance is configured so as to permit a magnitude of the volume flow of the liquid delivered through said delivery line to be set by way of an electrical volume signal which can be selected via said actuating element.

13. The high-pressure cleaning appliance of claim 12, wherein said electrical volume signal can be selected steplessly and can be set steplessly via said actuating element.

14. The high-pressure cleaning appliance of claim 13, wherein:

said actuating element has a first end position, in which said valve is in the closed state; said actuating element has a second end position, in which said valve is in said open state;

said actuating element covers a travel distance between the first end position and the second end position; and, said high-pressure cleaning appliance is configured in such a way that the volume flow of the liquid delivered through said delivery line is, at least sectionally, proportional to the travel distance covered by said actuating element.

15. The high-pressure cleaning appliance of claim 1, further comprising:

a bypass line, said bypass line connecting said delivery line between said delivery pump and said spraying-out opening to said delivery line between said connection and said delivery pump; and an overpressure valve being arranged in said bypass line.

* * * * *